Patented Apr. 15, 1941

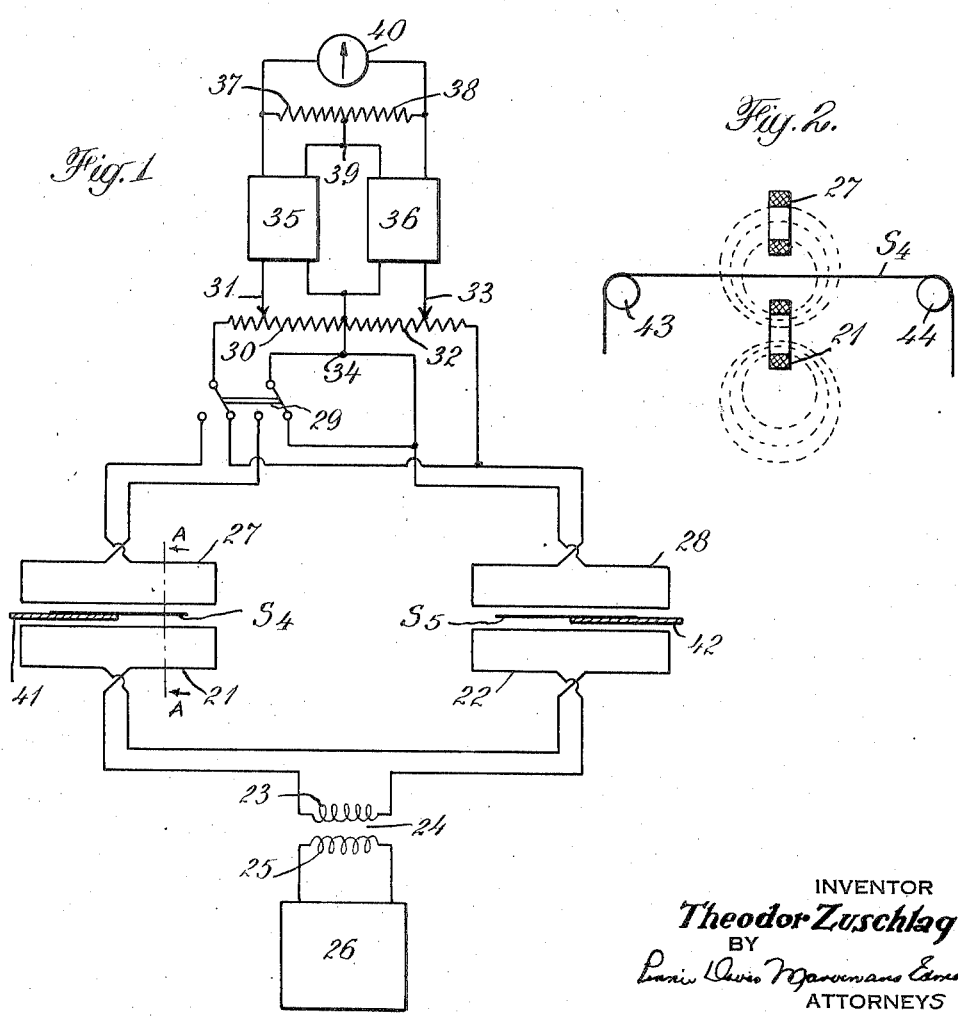

2,238,091

UNITED STATES PATENT OFFICE 2,238,091

TESTING CONDUCTIVE BODIES

Theodor Zuschlag, West Englewood, N. J., assignor to Magnetic Analysis Corporation, Long Island City, N. Y., a corporation of New York Application May 3, 1938, Serial No. 205,693

1 Claim. (Cl. 175—183)

This invention is concerned with the investigation of the thickness of conductive sheets by electrical means and aims to provide an improved apparatus for conducting such investigations. The invention finds particular utility in the determination of thickness or variations in thickness of conductive sheets such as metal foil, ribbons and strips.

Manufacturers of metal foil and the like find it desirable to investigate the thickness of their product, because in some applications uniformity in thickness is not only desirable but essential. Metal foil having a thickness of only .0001 inch is produced commercially at present, and ordinary mechanical measuring means are not adequate to detect variations in thickness of such material without interrupting its production. Electrical devices for determining thickness of such foil have been proposed heretofore, but insofar as I am aware, no simple, rugged and inexpensive mechanism capable of accurately determining foil thickness or variations therein has been devised heretofore. The apparatus of my invention fulfills these requirements.

In summary, my invention contemplates in apparatus for determining the thickness of conductive sheets, the combination which comprises a pair of substantially electrically identical primary coils wound in substantially rectangular form with dielectric cores and spaced apart out of inductive relationship with each other, means for setting up substantially identical alternating electrical fields in the primary coils, a pair of substantially electrically identical secondary coils wound in substantially rectangular form and disposed respectively in inductive relationship beside the primary coils but spaced therefrom, each primary coil and its adjacent secondary coil having their axes substantially parallel and with long sides of the rectangles facing each other, a circuit connecting the secondary coils in series opposition, current indicating means connected in said circuit, means for disposing a conductive sheet of known thickness between one primary coil and the adjacent secondary coil with the plane of the sheet substantially parallel to the axes of the coils and to the long faces thereof, and means for disposing a conductive sheet the thickness of which is to be determined between the other primary coil and its adjacent secondary, the plane of this sheet being substantially parallel to the axes of these coils and to the long faces thereof.

My invention will be more thoroughly understood in the light of the following detailed description taken in conjunction with the accompanying drawing in which:

Fig. 1 is a schematic representation of a presently preferred form of the apparatus of my invention adapted for the comparison of thickness of conductive sheets and for determining whether a sample being investigated is thicker or thinner than a standard sheet; and Fig. 2 is a section taken through a set of test coils of the apparatus of Fig. 1 along the line A—A.

Referring now to Fig. 1, the apparatus (which is adapted to determine whether or not an indicated thickness difference is positive or negative, i. e., whether a specimen being investigated is thicker or thinner than a standard) has a pair of electrically identical primary coils 21, 22, spaced apart so as to be substantially out of inductive relationship with each other, and preferably constructed of a number of turns of wire of low ohmic resistance wound in rectangular form. The coils may be wound around rectangular cores of dielectric material, but air cores are preferable, and cores of magnetizable or conductive material should be avoided for reasons stated hereinbefore. The primary coils are connected in series to the terminals of a secondary coil 23 of a coupling transformer 24, the primary coil 25 of which is connected to a suitable source of alternating current 26. The primary coils may be connected in parallel if desired, and may be connected direct to the power source, the object in all cases being to set up in the two primary coils substantially identical alternating electrical fields. The use of a coupling transformer, however, is recommended because it permits efficient coupling of power source with primary coils even if the impedance of the power circuit is markedly different from the impedance of the coils.

Secondary coils 27, 28, which should be substantially identical from the electrical standpoint, are disposed respectively adjacent the primary coils, but spaced therefrom. The secondary coils, like the primaries, preferably should be rectangular in shape, and wound on air cores. Conveniently, the secondaries may be of the same size and shape as the primaries. The secondary coils are so disposed that their axes are parallel to the respective adjacent primary coils, and preferably should lie in the same plane as the respective adjacent primary coils and (viewed in this plane) parallel to the primary coils. In other words, each pair of primary and secondary coils are disposed in the same plane but spaced from and parallel to each other in said plane. The relative position of the coils of a pair is well illustrated in Fig. 2.

The secondary coils are connected in series opposition in a network as follows:

The terminals of the secondary coil 27 are connected to the first and third terminals of a double-pole double-throw switch 29, the second and fourth terminals of this switch being connected to the terminals of the other secondary coil 28. The contact arms of the switch are connected respectively to the ends of a first high ohmic potentiometer 30 having a slider 31. A second high ohmic potentiometer 32, having a slider 33 is provided, one end of this potentiometer (the left end in Fig. 1) being connected to the adjacent end of the first potentiometer 30 and also to a terminal of the secondary coil 28 through a "common terminal" 34 (common in the sense that it is connected to a contact arm of the switch, to a terminal of the secondary coil 28, and to adjacent ends of both potentiometers). The other end of the second potentiometer is connected to the other end of the secondary coil 28.

A pair of amplifiers 35, 36, which may be of any convenient form is provided. The input leads of the amplifier 35 are connected respectively to the slider 31 of the first potentiometer and to the "common terminal" 34, the other amplifier being connected in similar fashion to the slider 33 of the second potentiometer and to the common terminal.

Each amplifier is provided with two output leads. The output leads of the amplifier 35 are connected respectively to the ends of a fixed resistor 37, and the output leads of the other amplifier 36 are connected respectively to the ends of a second fixed resistor 38. Adjacent ends of the two resistors are connected together through a second "common terminal" 39.

The ends of the two resistors remote from the second "common terminal" are connected to each other through an indicating means 40, which may be any suitable D. C. or A. C. galvanometer.

Shelves 41, 42, or similar supports of non-conductive unmagnetizable material may be provided for holding in proper position a specimen $S_4$ and a standard $S_5$ (conductive sheets) in the fields of the respective sets of coils. If desired, means such as rollers 43, 44 (as shown in Fig. 2) may be provided for moving a long sheet of foil or the like to be tested through the field of the coil set 21, 27, so that successive sections of the sheet are subjected to test. As indicated hereinbefore, the position of a sheet with respect to the set of coils between which it is interposed should be such that the surface of the sheet is perpendicular to a plane defined by the axes of the coils with the cross-section of the sheet in said plane parallel to said axes.

I believe that the effect of the interposition of a sheet of conductive material between a set of coils is to weaken and distort the lines of force emitted from the primary coil, this being due to eddy currents set up in the conductive material. But whatever be the explanation, the fact remains that the potential of the induced current in the secondary coil is affected by and accurately reflects changes in the thickness of a conductive sheet interposed as described hereinbefore. Moreover, the accuracy of measurement is not greatly affected if the sheet is disposed nearer to one coil axis than to the other provided that the parallel relationship described hereinbefore is maintained. Hence, vibration of a rapidly moving specimen does not interfere with measurement.

The operation of the apparatus of Figs. 1 and 2 may be described as follows:

The standard $S_5$ of known or desired thickness is inserted between the coils 22, 28. The switch is thrown to the right so that both amplifiers receive potential from the secondary coil 28. The applied E. M. F. is amplified and carried to the output resistors 37, 38, and to the indicator 40. If the potentials from both amplifiers are equal, there will be no deflection of the indicator. This condition, however, is seldom obtained without adjustment due to unavoidable variation in the amplification characteristic of the two amplifiers, so it usually is necessary to adjust the slider of at least one of the potentiometers until the deflection at the indicator is zero. This manipulation calibrates the apparatus and places it in readiness to compare the specimen $S_4$ with the standard.

The specimen is inserted in proper position in the field of the coils 21, 27; the switch is thrown to the left to connect the secondary coil 27 to the potentiometer 30, and the indicator is read. If the thickness of the specimen corresponds to that of the standard, the potential of the secondary 27 will equal that of the secondary 28, and this condition is recognizable through the absence of any deflection at the indicator. On the other hand, if the thickness of standard and specimen is not the same, the indicator will be deflected, the magnitude and direction of which is a measure of the magnitude and sign of the difference in thickness.

The apparatus may also be operated in another way which avoids the necessity of keeping a standard within the apparatus during testing. Thus the standard $S_5$ may be inserted in the coil set 21, 27 with the switch thrown to the left. The indicator is then brought to zero through the adjustment of the potentiometers, and the standard is replaced by a specimen to be tested. If the specimen is of the same thickness as the standard, the indicator will return to zero; otherwise, the deflection indicates the magnitude and sign of the difference in thickness.

Generally speaking, the thinner the conductive sheet to be tested, the higher should be the frequency of the energizing current. Thus, I have found that with very thin foil, say .0001 inch in thickness, a frequency of 5000 cycles is desirable, whereas with moderately thick sheet, say .01 inch, a frequency of 500 cycles is satisfactory.

I claim:

In apparatus for determining the thickness of conductive sheets, the combination which comprises a pair of substantially electrically identical primary coils wound in substantially rectangular form with dielectric cores and spaced apart out of inductive relationship with each other, means for setting up substantially identical alternating electrical fields in the primary coils, a pair of substantially electrically identical secondary coils wound in substantially rectangular form and disposed respectively in inductive relationship beside the primary coils but spaced therefrom, each primary coil and its adjacent secondary coil having their axes substantially parallel and with long sides of the rectangles facing each other, a circuit connecting the secondary coils in series opposition, current indicating means connected in said circuit, means for disposing a conductive sheet of known thickness between one primary coil and the adjacent secondary coil with the plane of the sheet substantially parallel to the axes of the coils and to the long faces thereof, and means for disposing a conductive sheet the thickness of which is to be determined between the other primary coil and its adjacent secondary, the plane of this sheet being substantially parallel to the axes of these coils and to the long faces thereof.

THEODOR ZUSCHLAG.